US008124688B2

(12) United States Patent
Meijer et al.

(10) Patent No.: US 8,124,688 B2
(45) Date of Patent: *Feb. 28, 2012

(54) COATING COMPOSITION COMPRISING A REACTIVE DILUENT OF MALONATE

(75) Inventors: Michel Daniel Meijer, Leiden (NL); Gijsbert Pieter Mes, Bennekom (NL); Hendrik Philip Kelders, Rijnsaterwoude (NL); Robert Paul Klaasen, Amsterdam (NL); Adrianus Jozefus Hendricus Lansbergen, Oosterbeek (NL); Martin Leonhard Spierenburg, Apeldoorn (NL)

(73) Assignee: Akzo Novel Coatings International B.V., Arnhem (NL)

( * ) Notice: Subject to any disclaimer, the term of this patent is extended or adjusted under 35 U.S.C. 154(b) by 461 days.

This patent is subject to a terminal disclaimer.

(21) Appl. No.: 12/295,236

(22) PCT Filed: Mar. 23, 2007

(86) PCT No.: PCT/EP2007/052821
§ 371 (c)(1),
(2), (4) Date: Mar. 25, 2009

(87) PCT Pub. No.: WO2007/113145
PCT Pub. Date: Oct. 11, 2007

(65) Prior Publication Data
US 2009/0253859 A1    Oct. 8, 2009

(30) Foreign Application Priority Data

Mar. 30, 2006  (EP) .................................... 06111959

(51) Int. Cl.
*C08G 69/50* (2006.01)
*C08G 63/16* (2006.01)
*C08G 63/49* (2006.01)
*C08L 67/00* (2006.01)

(52) U.S. Cl. .............. 525/7.3; 525/7; 525/427; 523/501
(58) Field of Classification Search .................. 523/501; 525/7, 7.3
See application file for complete search history.

(56) References Cited

U.S. PATENT DOCUMENTS

| 4,255,196 | A | * | 3/1981 | Emmons et al. ........... 106/31.66 |
| 4,523,007 | A | * | 6/1985 | Schipfer et al. ............... 528/227 |
| 5,064,892 | A |   | 11/1991 | Hofland et al. |
| 5,219,958 | A | * | 6/1993 | Noomen et al. ................ 525/10 |
| 6,521,716 | B1 | * | 2/2003 | Leake ........................... 525/421 |
| 2003/0054103 | A1 | * | 3/2003 | Sato et al. ..................... 427/256 |
| 2007/0060713 | A1 | * | 3/2007 | Gracey et al. ................ 525/438 |
| 2009/0197094 | A1 | * | 8/2009 | Nakahara et al. .......... 428/423.7 |

FOREIGN PATENT DOCUMENTS

| EP | 0 357 128 | 8/1989 |
| EP | 0 653 468 | 5/1995 |
| WO | WO 97/02226 | 1/1997 |
| WO | WO 97/02230 | 1/1997 |
| WO | WO 98/00387 | 1/1998 |
| WO | WO 2004/099329 A1 * | 11/2004 |

OTHER PUBLICATIONS

International Search Report, PCT International Application No. PCT/EP2007/052821, dated Jun. 13, 2007.
International Preliminary Report on Patentability and Written Opinion of the International Searching Authority, PCT International Application No. PCT/EP2007/052821, dated Sep. 30, 2008.

* cited by examiner

*Primary Examiner* — Tae H Yoon
(74) *Attorney, Agent, or Firm* — Kenyon & Kenyon LLP

(57) ABSTRACT

Coating composition comprising an oxidatively drying binder, such as an alkyd, and a reactive diluent. The diluent is an ester of malonic acid and an unsaturated mono-alcohol, e.g., geraniol, farnesol, citronellol and/or nerol.

15 Claims, No Drawings

COATING COMPOSITION COMPRISING A REACTIVE DILUENT OF MALONATE

The present invention relates to a coating composition comprising a reactive diluent and an oxidatively crosslinkable binder system, such as an alkyd binder.

Oxidatively crosslinkable binders are binders which crosslink on exposure to oxygen. Examples of such binders are polymers which contain residues of aliphatic compounds, e.g., unsaturated fatty acid residues. The unsaturation in polymers from such fatty acid groups imparts latent crosslinkability, so that when a coating composition based on such a binder is exposed to air, the binder undergoes crosslinking, thereby improving the coating's properties such as hardness, durability, and chemical resistance. A particular advantage of coatings based on binders with unsaturated fatty acid residues is an improved glossy appearance.

Oxidatively crosslinkable binders can be polymers of any type, such as polyurethanes or acrylates, comprising unsaturated fatty acid groups. Typical examples of commonly used oxidatively crosslinkable binders are alkyds. Alkyds are well-known binders of decorative paints curable under the influence of oxygen and can be prepared by esterification from polybasic acids or anhydrides, polyols, and fatty acids. Alkyd resins are generally used in coating compositions which ordinarily contain large amounts of solvents. Since solvents evaporate after application of the paint, they form an environmental and health problem.

To reduce the volatile content in solvent borne paints, it has been proposed to use reactive diluents. A feature of reactive diluents is that such diluents can copolymerize with the used binder system. This way reactive diluents can be used to replace part or all of the traditional solvents normally used in such formulations, thereby reducing emission of solvents on drying of the coating.

Reactive diluents usually are compounds or mixtures of compounds of relatively low viscosity and a relatively high boiling point which act as solvents during the formulation and processing of the coating. Reactive diluents for paint systems have been disclosed in, e.g. EP-A-0 357 128. The drawback of these reactive diluents is that they generate acrolein, a toxic volatile, as a side reaction of oxidative drying.

In WO 97/02230, WO 97/02226, and WO 98/00387 reactive diluents based on esters and ethers of 2,7-octadienol have been proposed. It was found that these induce severe yellowing and embrittlement upon aging of the paint film.

The object of the invention is to find reactive diluents particularly useful for paints which do not form toxic volatiles with oxidative drying, result in good viscosity reduction, and do not affect properties like drying behaviour, hardness, yellowing, and durability.

The object of the invention is achieved by a reactive diluent which is at least partly an ester of malonic acid and an alcohol. The alcohol can for example be an unsaturated mono-alcohol, e.g., a polyunsaturated mono-alcohol. Preferably, these olefinic unsaturations are not present in the chain ends. Suitable mono-alcohols are geraniol, farnesol, citronellol, and nerol, and the like.

The reactive diluent may comprise a building block derived from an aldehyde coupled to the malonate backbone by a Knoevenagel reaction. A Knoevenagel reaction is a nucleophilic addition of an active hydrogen compound to a carbonyl group followed by a dehydration reaction in which a molecule of water is eliminated. In this reaction the carbonyl group is an aldehyde or a ketone. Usually a weakly basic amine is used as a catalyst. The aldehyde derived building block can, e.g., be selected from the group comprising citronellal, furfural, isobutyraldehyde, benzylaldehyde and cinnamaldehyde.

The reactive diluent may optionally be a polyester, e.g. a polymalonate, by using one or more polyol building blocks, such as diols or triols. Examples of suitable divalent polyols are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, 2-ethyl-2-butyl-1,3-propane diol, cyclohexane-1,4-dimethanol, benzene-1,4-dimethanol, and hydrogenated bisphenol-A. Examples of suitable triols are glycerol, trimethylol ethane, and trimethylol propane. Linear diols will yield low-viscosity diluents, cyclic diols and triols will yield higher-viscosity diluents with higher hardness or better drying properties.

Typical oxidatively drying binders are alkyd resins. At least a part of the alkyd resin is oxidatively drying as a result of the incorporation of a large number of unsaturated, aliphatic compounds, at least a portion of which is polyunsaturated. The unsaturated aliphatic compounds preferably are unsaturated fatty acids, more particularly polyunsaturated fatty acids. Examples of fatty acids comprising one equivalent of unsaturated CC bonds are myristoleic acid, palmitoleic acid, oleic acid, gadoleic acid, erucic acid, and ricinoleic acid, and mixtures thereof. Examples of fatty acids comprising two or more equivalents of unsaturated CC bonds include linoleic fatty acid, linolenic fatty acid, elaeostearic fatty acid, licanic fatty acid, arachidonic fatty acid, clupanodonic fatty acid, nisinic fatty acid, and mixtures thereof. Fatty acids containing conjugated double bonds, such as dehydrated castor oil fatty acid, wood oil fatty acid and/or calendula oil fatty acid, can be used as well. Fatty acids derived from soya oil are especially suitable.

Examples of suitable divalent polyol compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol. Preferably, use is made of compounds having 3-12 carbon atoms, e.g., glycerol, pentaerythritol and/or dipentaerythritol.

Alternatively or additionally, polycarboxylic acids can be used as building blocks for the oxidatively drying polyunsaturated condensation products. Examples of suitable polycarboxylic acids include phthalic acid, citric acid, fumaric acid, mesaconic acid, maleic acid, citraconic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerized fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetra-carboxylic acid, endoisopropylidene-cyclohexane-1,2-dicarboxylic acid, cyclohexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1-4 carbon atoms.

Optionally, the oxidatively drying polyunsaturated condensation product may comprise other building blocks, which can for example be derived from monocarboxylic acids such as pivalic acid, 2-ethylhexanoic acid, lauric acid, palmitic acid, stearic acid, 4-tert. butyl-benzoic acid, cyclopentane carboxylic acid, naphthenic acid, cyclohexane carboxylic acid, 2,4-dimethyl benzoic acid, 2-methyl benzoic acid, benzoic acid, 2,2-dimethylol propionic acid, tetrahydrobenzoic acid, and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed.

Optionally, isocyanates may also be used as building blocks for the oxidatively drying polyunsaturated condensation product. Suitable isocyanates are for example diisocyanates, such as 1,6-hexane diisocyanate, isophorone diisocyanate, toluene diisocyanate, diphenyl diisocyanate, and dicyclohexylmethane diisocyanate. Triisocyanates can also be used.

The unsaturated groups in the oxidatively drying polyunsaturated condensation product are preferably introduced by the fatty acids, but may, alternatively or additionally, be introduced by one or more of the polyols, carboxylic acids or anhydrides or other building blocks used, such as fatty monoalcohols.

The oxidatively drying polyunsaturated condensation product has pendant groups in an amount of more than 20%, preferably more than 50%, by weight of the condensation product. An amount of more than 65% is even more preferred.

A specific example of a suitable alkyd is the condensation product of soya oil, phthalic anhydride, and pentaerythritol.

The alkyd resins can be obtained by direct esterification of the constituent components, with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil. Transesterification with the polyols and, optionally, other building blocks will then give the final alkyd resin. This transesterification generally takes place at a temperature in the range of 115 to 250° C., optionally with solvents such as toluene and/or xylene also present. The reaction generally is carried out in the presence of a catalytic amount of a transesterification catalyst. Examples of transesterification catalysts suitable for use include acids such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

Optionally, the oxidatively drying binder may be used in combination with other resins, for example acrylic resins or polyurethanes. Preferably, the coating composition comprises at least 20 wt. % of oxidatively drying binder, more preferably more than 60 wt. % of total binder.

The number average molecular weight Mw of the binder will generally be above 150. Preferably, it will be higher than 1,000, e.g. higher than 5,000. For reasons of viscosity, the number average molecular weight will generally be below 120,000, preferably below 80,000.

Alkyds are often characterized by their oil length. Oil length is defined as the weight percentage of fatty acid building blocks (calculated as their triglycerides) in the alkyd resin. Long oil lengths (55% or higher) result in improved oxidative drying, good substrate adhesion, excellent flow properties, good solubility in aliphatic solvents, and low viscosity, even with low solvent content. However, these alkyds show strong yellowing. Medium oil length alkyds (40-55%) also have good solubility but show a higher viscosity. Paint films made of medium oil length alkyds have better mechanical properties such as hardness and; durability. Short oil length alkyds (less than 40%) require additional measures, such as the use of additional siccatives or amino resins, to obtain acceptable drying times. The reactive diluents according to the present invention can be used with alkyds of any oil length.

To support the oxidatively drying mechanism, siccatives or driers can be used. Examples of suitable siccatives are metal salts of aliphatic acids, including cycloaliphatic acids, or aromatic acids, such as ethylhexanoic acid, octanoic acid, and naphthenic acid, where the metal is, for example, cobalt, manganese, lead, vanadium, iron, zirconium, calcium, copper, potassium, lithium, zinc, aluminium, magnesium, bismuth, or a rare earth metal. Alternatively, the siccative may be selected from metal oxide acetylacetonates, metal acetylacetonates, metal chlorides, metal sulphates, and metal alcoholates, where the metal is, for example, selected from the above-mentioned metals. Mixtures of siccatives can also be used. The siccatives (calculated as metal) are usually applied in an amount of 0.001 to 3 wt. %, calculated on the total binder solids content.

Besides these siccatives, the coating composition may optionally comprise drying-accelerating complexing agents, for example, 2,2'-bipyridyl and 1,10-phenantroline. The complexing agents can be added in an amount of 0-3 wt. %, e.g., 0.1-1.5 wt. %, based on the weight of the total binder.

The composition is particularly suitable for formulation as a solvent borne coating composition. The reactive diluents of the present invention can be used to reduce the volatile organic content (VOC) below 300 g/l, a so-called high solids composition (solids content more than about 60%). However, it is also suitable for conventional coating compositions with a higher solvent content. In this context, VOC is determined in accordance with US standard ASTM D 2369 (one hour at 110° C.). Suitable solvents are for instance aromatic solvents such as toluene or xylene, as well as aliphatic solvents such as ethyl diglycol, ethyl glycol acetate, butyl glycol, butyl glycol acetate, butyl diglycol, butyl diglycol acetate, and methoxypropylene glycol acetate. Commercially available solvents are for instance Shellsole® D40, an aliphatic hydrocarbon solvent available from Shell, Dowanol® PMA from Dow, and Solvesso®-150, available from ExxonMobil.

Alternatively, the reactive diluents according to the invention can be formulated into air-drying water borne compositions by combining them with alkyd emulsions, optionally comprising co-solvents or humectants, such as glycols. Particularly useful for water borne compositions are reactive diluents with ionic and/or nonionic stabilizing groups built into their structure, e.g. by using diols containing carboxyl, sulfosuccinate or polyethylene glycol side groups.

The composition according to the invention can be used as a clear varnish or may contain pigments. Pigments can ordinarily include opacifying pigments, such as titanium dioxide, zinc oxide, leaded zinc oxide, titanium calcium, or tinting pigments, such as carbon black, yellow oxides, brown oxides, tan oxides, raw and burnt sienna or umber, chromium oxide green, phthalocyanine green, phthalonitrile blue, ultramarine blue, cadmium pigments or chromium pigments. Fillers can also be added, such as clay, silica, talc, mica, and the like.

The coating composition can furthermore contain one or more additives such as UV stabilizers, cosolvents, dispersants, surfactants, inhibitors, fillers, anti-static agents, flame-retardant agents, lubricants, anti-foaming agents, extenders, plasticizers, anti-freezing agents, waxes, thickeners, thixotropic agents, etc. Furthermore, the coating composition according to the invention may optionally comprise various antioxidants and anti-skinning agents.

The invention is further illustrated by the following examples. In the examples, the following commercially obtained compounds are used:

| | |
|---|---|
| Dowanol ® PM | methoxypropanol, available from Dow; |
| Exkin ® 2 | anti-skinning agent (MEKoxim), available from Elementis |
| Kronos ® 2310 | titanium dioxide, a white pigment available from Kronos; |
| Nuodex ® Combi APB | a siccative composition comprising metal driers (cobalt, zirconium and calcium), commercially available from Elementis |
| Shellsol ® D40 | an aliphatic hydrocarbon solvent supplied by Shell. |

The following measuring methods were used:
VOC (volatile organic content) was determined according to ASTM D2369 (1 hour at 110° C.);
Viscosity was determined on a Brookfield® CAP2000 cone and plate viscometer at 23° C.;
Nuclear Magnetic Resonance measurements were performed with a Bruker AC300 Nuclear Magnetic Resonance meter;
Yellowing was determined as follows. A 30-micrometer dry film was applied on a glass plate. After 1 week's drying of the paint the L, a, b values of the paint (according to CIE lab, ASTM-E313) were determined with a MacbethColorEye® 7000A. Subsequently, these panels were placed in a dark 50° C. oven for 175 hours and the L, a, b values were measured again. The difference in b-value, Δb, is denoted as the yellowing;
The drying time was measured as follows. The coating composition was applied on a glass plate with a draw bar in a dry layer thickness of 30 μm. Curing took place at 10° C. and 80% humidity in a climatized room under TL-055 light. Drying was tested by means of a BK drying recorder. The end of BK phase 3, which is reached when the coating is not damaged down to the substrate anymore, was recorded as the drying time;
The nail hardness of the coating was tested by strongly scraping through the film using a pair of tweezers. The results were rated 0 (not acceptable) to 5 (excellent).

EXAMPLE 1-11

Reactive diluents were prepared by the following procedure:
Dimethylester of the alkylidenemalonate mentioned in table 1, unsaturated alcohol as mentioned in table 1, if applicable diol mentioned in table 1, and dibutyltinoxide (1500 ppm) were transferred into a flask fitted with stirrer, thermometer, nitrogen inlet and condenser. The mixture was put under nitrogen atmosphere and heated until 150° C. At 130° C. the transesterification starts, so methanol is formed and distills off. The mixture is heated at 150° C. during 20-24 hours. To remove the remaining free mono-alcoholol, the flask is put under 20-40 mbar vacuum for an hour. A small stream of nitrogen is passed through the flask. The conversion is determined by $^1$H-NMR.
Dimethyl alkylidenemalonates were prepared according to the following procedure for Knoevenagel modification:
Dimethyl malonate (5 moles), aldehyde (5 moles), 530 g toluene, 2.8 g piperidine and 2.93 g propionic acid were mixed together in a flask fitted with stirrer, thermometer, nitrogen inlet and condenser, and heated until reflux. Via a Dean stark trap water was separated. Every 2 hours half of the starting amount of piperidine and propionic acid were added to the flask. After 20 hours 130 g toluene and 2 mole aldehyde were extra added. The reaction is finished when the theoretical amount of water is collected or when $^1$H-NMR shows no remaining free methylene group of the malonate. When the reaction is complete, part of the toluene is evaporated under vacuum. After cooling to room temperature, 300 g diethyl ether is added to the residue and the product is washed with water, once with 0.05 N HCl to remove piperidine, again with water, then with 4% $Na_2CO_3$ to remove propionic acid, next twice with water to neutralize. The organic phase is dried on $MgSO_4$ and the solvent is evaporated.

TABLE 1

| Example | Alcohol | Diol | Alkylidene |
|---|---|---|---|
| 1 | 2,7-Octadienol 154 g | None | dimethylmalonate 80 g |
| 2 | 2,7-Octadienol 108 g | None | Isobutylidene dimethylmalonate 83.7 g |
| 3 | 2,7-Octadienol 62.4 g | None | Furylidene dimethylmalonate 52.9 g |
| 4 | 2,7-Octadienol 126 g | None | Benzylidene dimethylmalonate 95 g |
| 5 | 2,7-Octadienol 126 g | None | Cinnamylidene dimethylmalonate 120 g |
| 6 | 2-Methoxy-3-butenol 108 g | None | Isobutylidene dimethylmalonate 82.6 g |
| 7 | Nerol 132 g | None | Isobutylidene dimethylmalonate 80 g |
| 8 | 2-Hexenol 140.8 g | None | Isobutylidene dimethylmalonate 130.2 g |
| 9 | 2,7-Octadienol 237.8 g | 1,6-Hexanediol 167 g | dimethylmalonate 311 g |
| 10 | 2,7-Octadienol 401.6 g | 1,6-Hexanediol 80.3 g | dimethylmalonate 300 g |
| 11 | Nerol 256 g | 1,6-Hexanediol 80.8 g | dimethylmalonate 200 g |

EXAMPLE 12

A reactive diluent was obtained by Knoevenagel modification of malonate groups of resin obtained from example 9 according to the above procedure using isobutyraldehyde.

EXAMPLE 13

A reactive diluent was obtained by Knoevenagel modification of malonate groups of resin obtained from example 10 according to the above procedure using isobutyraldehyde.

EXAMPLES 14 AND 15

Reactive diluents were obtained by Knoevenagel modification of malonate groups of resin obtained from example 11 according to the above procedure using isobutyraldehyde (example 14) or anisaldehyde (example 15).
Paint Compositions
The above mentioned reactive diluents were used in a paint composition comprising 422 wt parts solid binder (containing 70% alkyd A and 30% reactive diluent, or 100% Alkyd A for comparative example 1), 333 wt parts Kronos® 2310 (Titanium dioxide), 9.4 wt parts pigment dispersing agent, 31.5 wt parts Nuodex® Combi APB drier and 2.2 wt parts Exkin® 2 (MEKoxim). The paint was diluted with Shellsol® D40 to an application viscosity of 0.5 Pa·s. The paint properties of the first series of paints are shown in Table 2.

COMPARATIVE EXAMPLE 1

A high solids alkyd paint was formulated without a reactive diluent. Alkyd A was a high solids alkyd consisting of partly conjugated linoleic, oleic and stearic fatty acids, with an oil content of 74% and a solids content of 89% in Shellsol D40, with a viscosity of 10 Pa·s at 23° C.

COMPARATIVE EXAMPLE 2

A reactive diluent was made according to Example S1 of patent WO 97/02230. The reactive diluent was an ether-ester prepared of dimethyl maleate, 2,7-octadienol and zinc acetate catalyst. The resulting reactive diluent was added to a sample of the same paint composition as the reactive diluents of Examples 1-13, as described above.

TABLE 2

|  | VOC (g/l) | Drying (hrs) BK phase 1-3 | Yellowing Δb-value | Nail hardness (rating) | Durability Halflife (hrs) |
|---|---|---|---|---|---|
| Comp. Example 1 | 286 | 5.2 | 3.4 | 1.0 | 800 |
| Comp. Example 2 | 163 | 6.6 | 5.9 | 2.0 | 500 |
| Example 1 | 140 | 5.7 | 6.0 | 2.5 | 350 |
| Example 2 | 150 | 5.9 | 5.3 | 2.5 | 510 |
| Example 5 | 187 | 7.1 | 4.5 | 2 | 530 |
| Example 6 | 165 | 5.8 | 3.3 | 2.5 | 760 |
| Example 7 | 152 | 6.9 | 3.1 | 1.5 | 760 |
| Example 8 | 149 | 6.5 | 2.8 | 2.0 | 470 |

A second series was tested. For a better comparison with the first series, Comparative Example 1 was tested again in this second series. The paint properties of a second series of paints are shown in Table 3,

TABLE 3

|  | VOC (g/l) | Drying (hrs) BK phase 1-3 | Nail hardness (rating) | Durability Halflife (hrs) |
|---|---|---|---|---|
| Comp. Example 1 | 279 | 5.9 | 1.0 | 590 |
| Example 10 | 156 | 7.0 | 2.5 | 290 |
| Example 11 | 174 | 6.7 | 2.0 | 240 |
| Example 12 | 190 | 5.1 | 2.0 | 310 |
| Example 13 | 158 | 5.8 | 2.0 | 310 |
| Example 14 | 174 | 5.5 | 1.5 | 185 |

EXAMPLE 16

A reactive diluent was produced by the procedure mentioned under example 1-11 using 155.3 g dimethyl isobutylidenemalonate, 52.3 g 1,3-propanediol and 35.2 g nerol. This material was modified by addition of sodium bisulfite onto the Knoevenagel double bonds as follows: Resin and 65.4 g sodium bisulfite were reacted at 95° C. in a solvent mixture of 130 g water and 130 g methoxypropanol (Dowanol® PM). When all Knoevenagel double bonds had disappeared according to $^1$H-NMR, solvents were removed by evaporation. This yielded a low viscosity diluent that dissolved completely in water at a solids content of 75%.

The invention claimed is:

1. A coating composition comprising an oxidatively drying binder and a reactive diluent, wherein at least a part of the diluent is an ester of malonic acid, said ester comprising a building block derived from an aldehyde coupled to the malonate backbone by a Knoevenagel reaction, wherein the aldehyde-derived building block is selected from the group consisting of citronellal, furfural, isobutyraldehyde, benzylaldehyde, anisaldehyde and cinnamaldehyde.

2. The coating composition according to claim 1, wherein the diluent is an ester of malonic acid and an unsaturated mono-alcohol.

3. The coating composition according to claim 2, wherein the chain end of the mono-alcohol is free of unsaturated double bonds.

4. The coating composition according to claim 3, wherein the mono-alcohol is selected from the group consisting of geraniol, farnesol, citronellol and nerol.

5. The coating composition according to claim 1, wherein the ester comprises more than one ester group and comprises diol building blocks.

6. The coating composition according to claim 1, wherein the binder is an alkyd.

7. The coating composition according to claim 1, further comprising one or more solvents.

8. The coating composition according to claim 1, wherein the composition is a water borne composition.

9. The coating composition according to claim 2, wherein the ester comprises more than one ester group and comprises diol building blocks.

10. The coating composition according to claim 5, wherein the binder is an alkyd.

11. The coating composition according to claim 2, further comprising one or more solvents.

12. The coating composition according to claim 3, further comprising one or more solvents.

13. The coating composition according to claim 6, wherein the composition is a water borne composition.

14. The coating composition according to claim 7, wherein the composition is a water borne composition.

15. A coating composition comprising an oxidatively drying binder and a reactive diluent, wherein at least a part of the diluent is an ester of malonic acid and an unsaturated mono-alcohol, wherein said ester comprises more than one ester group and comprises diol building blocks.

* * * * *